United States Patent
He et al.

(10) Patent No.: US 9,202,282 B2
(45) Date of Patent: Dec. 1, 2015

(54) BOUNDARY EXTRACTION METHOD AND APPARATUS

(71) Applicant: FUJITSU LIMITED, Kawasaki (JP)

(72) Inventors: Yuan He, Beijing (CN); Jun Sun, Beijing (CN); Satoshi Naoi, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 217 days.

(21) Appl. No.: 13/906,001

(22) Filed: May 30, 2013

(65) Prior Publication Data

US 2013/0322768 A1 Dec. 5, 2013

(30) Foreign Application Priority Data

May 31, 2012 (CN) .......................... 2012 1 0177743

(51) Int. Cl.
*G06T 7/00* (2006.01)
*G06T 5/00* (2006.01)
*G06T 5/20* (2006.01)

(52) U.S. Cl.
CPC ............... *G06T 7/0085* (2013.01); *G06T 5/003* (2013.01); *G06T 5/20* (2013.01); *G06T 7/0083* (2013.01); *G06T 2207/10008* (2013.01); *G06T 2207/20136* (2013.01); *G06T 2207/20192* (2013.01); *G06T 2207/30176* (2013.01)

(58) Field of Classification Search
None
See application file for complete search history.

(56) References Cited

U.S. PATENT DOCUMENTS

| | | | |
|---|---|---|---|
| 5,995,115 A * | 11/1999 | Dickie ........................... | 345/441 |
| 2003/0095710 A1 | 5/2003 | Tessadro | |
| 2006/0072844 A1* | 4/2006 | Wang et al. .................... | 382/254 |
| 2010/0183225 A1* | 7/2010 | Vantaram et al. ............. | 382/173 |
| 2010/0239173 A1* | 9/2010 | Yamada et al. ................ | 382/199 |
| 2011/0118515 A1* | 5/2011 | Waters et al. ................... | 585/14 |
| 2011/0158514 A1* | 6/2011 | Chuang et al. ................ | 382/163 |
| 2012/0076420 A1* | 3/2012 | Kono et al. .................... | 382/199 |
| 2013/0322769 A1* | 12/2013 | Pan et al. ....................... | 382/199 |
| 2013/0330009 A1* | 12/2013 | Pan et al. ....................... | 382/199 |

FOREIGN PATENT DOCUMENTS

| | | |
|---|---|---|
| CN | 1423237 | 6/2003 |
| CN | 101567084 | 10/2009 |
| CN | 102044071 | 5/2011 |

OTHER PUBLICATIONS

Chenyang Xu; Prince, J.L., "Snakes, shapes, and gradient vector flow," Image Processing, IEEE Transactions on , vol. 7, No. 3, pp. 359,369, Mar. 1998.*
Hsien-Che Lee; Cok, D.R., "Detecting boundaries in a vector field," Signal Processing, IEEE Transactions on , vol. 39, No. 5, pp. 1181,1194, May 1991 doi: 10.1109/78.80971.*
Mortensen, Eric N. et al., "Interactive Segmentation with Intelligent Scissors," *Graphical Models and Image Processing*, vol. 60, Issue 5, Sep. 1998, pp. 349-384.

* cited by examiner

*Primary Examiner* — Kim Vu
*Assistant Examiner* — Nathan Bloom
(74) *Attorney, Agent, or Firm* — Staas & Halsey LLP (57) ABSTRACT

The present invention discloses a boundary extraction method and apparatus, the method including: a gradient estimation step of estimating a gradient of each pixel in a captured image; a gradient adjustment step of adjusting, by enhancing a gradient of a target boundary of an object contained in the captured image and weakening a gradient of a noise boundary, the estimated gradient, so that the adjusted gradient is considered as a current gradient; and a boundary extraction step of extracting a boundary of the object based on the current gradient. According to the embodiments of the invention, in a case of using a non-contact imaging device to capture an image, it is possible to more accurately extract a boundary of an object contained in the captured image.

8 Claims, 6 Drawing Sheets

BOUNDARY EXTRACTION METHOD AND APPARATUS

This application claims the benefit of Chinese patent application No. 201210177743.7 titled "edge extraction method and apparatus," filed with the Chinese State Intellectual Property Office on May. 31, 2012, the entire disclosure of which is incorporated herein by reference.

FIELD OF THE INVENTION

The present invention relates to a boundary extraction method and apparatus, and more particularly, to a boundary extraction method and apparatus which are capable of accurately extracting a target boundary by adaptively enhancing a gradient of the target boundary while weakening a gradient of a noise boundary and eliminating a possibly existing disturbing gradient.

BACKGROUND OF THE INVENTION

Some non-contact imaging devices such as a top-mounted scanner or a digital camera or the like can image not only a two-dimensional object but also an object with a certain thickness, as compared with traditional flatbed scanners. For example, the top-mounted scanner can be used to image a book without separating it into individual pages. However, there may be curved surface deformations in an image of the book obtained by scanning due to limitation of a curved surface imaging pattern. Therefore, a correction model based on upper and lower contours is generally used to correct the curved surface deformations and it is necessary to extract a page boundary of a current page in order to ensure accuracy of a correction result.

Figure 1:
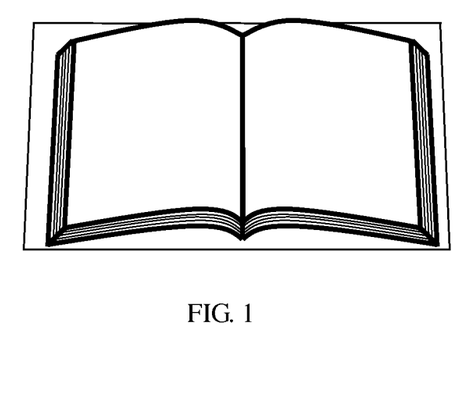
FIG. 1 illustrates a schematic diagram of imaging an open book using a non-contact imaging device.
Figure 2:
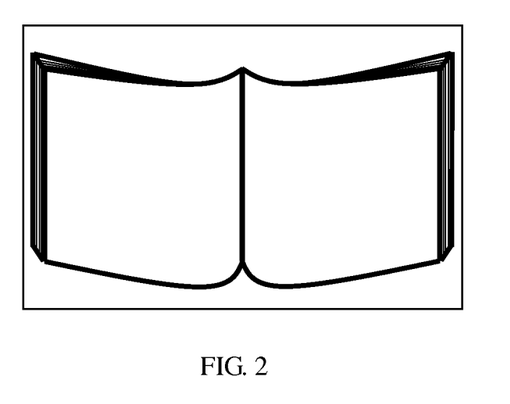
FIG. 2 illustrates an example of an imaging result obtained through the imaging operation as shown in FIG. 1.

Traditional boundary extraction methods typically detect boundaries of an object by tracking a curve having a maximum sum of gradients. However, as shown in FIGS. 1 and 2 for example, for the image obtained by imaging a thick object such as the book using the top-mounted imaging device for example, since there usually exist boundaries of other pages (i.e., noise boundaries) in the vicinity of the boundaries of the current page (i.e., the target boundaries), if a gradient-based method is used to track the page boundaries, the boundaries of other pages may influence accuracy of a result of tracking the boundaries of the current page. Further, gradients of contents near the boundaries of the current page may also influence the accuracy of the result of tracking.

SUMMARY OF THE INVENTION

The brief summary of the invention will be given below to provide basic understanding of some aspects of the invention. However, it shall be appreciated that this summary is neither exhaustively descriptive of the invention nor intended to define essential or important components or the scope of the invention but is merely for the purpose of presenting some concepts of the invention in a simplified form and hereby acts as a preamble of more detailed descriptions which will be presented later.

Thus, in view of the above circumstances, an object of the invention is to provide a method and apparatus which are capable of accurately extracting boundaries of an object with a gradient-based method by adaptively enhancing a gradient of a target boundary while weakening a gradient of a noise boundary. Further, this boundary extraction method and apparatus may also eliminate possibly existing disturbing gradients and update a boundary tracking result by performing an iterative boundary detection and correction operation on the boundary tracking result, thereby further improving accuracy of the boundary tracking.

Therefore, in order to achieve the forgoing object, according one aspect of an embodiment of the invention, there is provided a boundary extraction method which may include: a gradient estimation step of estimating a gradient of each pixel in a captured image; a gradient adjustment step of adjusting, by enhancing a gradient of a target boundary of an object contained in the captured image and weakening a gradient of a noise boundary, the estimated gradient, so that the adjusted gradient is considered as a current gradient; and a boundary extraction step of extracting a boundary of the object based on the current gradient.

According to a preferred embodiment of the invention, in the gradient adjustment step, the estimated gradient may be weighed with a weight determined based on a gradient difference between two predetermined adjacent regions of each pixel point, thus enhancing the gradient of the target boundary and weakening the gradient of the noise boundary.

According to another preferred embodiment of the invention, the weight TB may be determined based on the following formula: $TB=D_t/(D_b+\epsilon)$, wherein $D_t=\max\{f(N_t)\}-\min\{f(N_t)\}$, $D_b=\max\{f(N_b)\}-\min\{f(N_b)\}$, $N_t$ and $N_b$ represent the two predetermined adjacent regions of each pixel point, $D_t$ represents a difference between a maximum gradient and a minimum gradient in the region $N_t$, $D_b$ represents a difference between a maximum gradient and a minimum gradient in the region $N_b$, $D_t \geq D_b$, and $\epsilon$ is a predetermined constant.

According to another preferred embodiment of the invention, the boundary extraction method may further include: an error boundary determination step of detecting smoothness of the extracted boundary to determine whether the extracted boundary is error; a gradient correction step of correcting, in a case that the extracted boundary is error, the current gradient, so that the corrected gradient is considered as the current gradient; and an iteration step of repeating, based on the current gradient, the boundary extraction step, the error boundary determination step and the gradient correction step until a predetermined criterion is satisfied.

According to another preferred embodiment of the invention, the gradient correction step may further include: a boundary tendency prediction substep of predicting, starting from a region for which reliability of the extracted boundary is high, tendency of the boundary of the object in a predetermined direction; a boundary comparison substep of comparing, in the predetermined direction, each point on the extracted boundary with the predicted tendency, starting from a turning point at which the boundary is detected to be not smooth; an error section determination substep of determining a section from the turning point to a first point on the extracted boundary the difference between which and the predicted tendency is smaller than a predetermined threshold as an error section; and an elimination substep of setting a gradient of each point within the determined error section to be zero.

According to another aspect of the invention, there is also provided a boundary extraction apparatus which may include: a gradient estimation unit configured to estimate a gradient of each pixel in a captured image; a gradient adjustment unit configured to adjust, by enhancing a gradient of a target boundary of a object contained in the captured image and weakening a gradient of a noise boundary, the estimated gradient, so that the adjusted gradient is considered as a current gradient; and a boundary extraction unit configured to extract a boundary of the object based on the current gradient.

According to a further aspect of the invention, there is provided a storage medium including machine-readable program codes which cause an information processing apparatus to perform the forgoing boundary extraction method according to the invention when being executed on the information processing apparatus.

According to yet another aspect of the invention, there is further provided a program product containing machine executable instructions which cause an information processing apparatus to perform the forgoing boundary extraction method according to the invention when being executed on the information processing apparatus.

Therefore, according to embodiments of the invention, it is possible to significantly improve the accuracy of the boundary extraction by adaptively enhancing the target boundary of the object image captured by the non-contact imaging device while suppressing the noise boundary and further correcting the already obtained boundary tracking result by eliminating the possibly existing disturbing gradients.

Other aspects of the embodiments of the invention are given in the following portion of the specification, in which the detailed description is intended to fully illustrate the preferred ones of the embodiments of the invention without any limitation.

BRIEF DESCRIPTION OF THE DRAWINGS

The invention can be better understood by referring to the detailed description given below with reference to the accompanying drawings throughout which identical or similar components are denoted by identical or similar reference numbers. The drawings together with the following detailed explanation are included in this specification and form part of the specification so as to further illustrate preferred embodiments of the invention by way of example and explain principles and advantages of the invention. In the drawing.

DETAILED DESCRIPTION OF THE INVENTION

Exemplary embodiments of the present invention will be described below in conjunction with the accompanying drawings. For the sake of clarity and conciseness, not all the features of practical implementations are described in the specification. However, it is to be appreciated that numerous implementation-specific decisions shall be made during developing any of such practical implementations so as to achieve the developer's specific goals, for example, to comply with system- and business-relevant constraining conditions which will vary from one implementation to another. Moreover, it shall also be appreciated that such a development effort might be very complex and time-consuming but may simply be a routine task for those skilled in the art benefiting from this disclosure.

It shall further be noted that only those device structures and/or processing steps closely relevant to the solutions of the invention are illustrated in the drawings while other details less relevant to the invention are omitted so as not to obscure the invention due to those unnecessary details.

The boundary extraction method and apparatus according to the embodiments of the invention will be described with reference to FIGS. 1-10 below. It is to be understood that although the book serves as an example of the object to be imaged and the upper boundary of the current page of the book is extracted by way of example when describing the following embodiments, the invention is not limited thereto, and the invention can also be applied to extract other boundaries of the page of the book such as lower, left and right boundaries and even to extract boundaries of other objects than the book.

Figure 3:
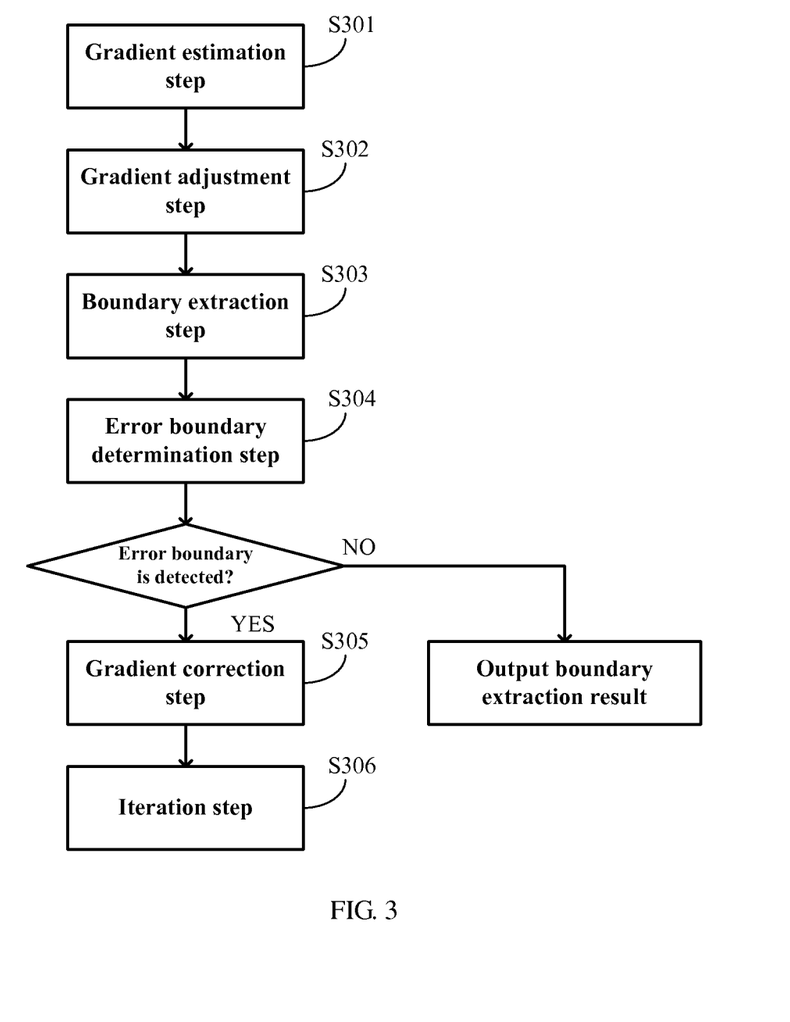
FIG. 3 is a flowchart illustrating a boundary extraction method according to an embodiment of the invention.

First, a boundary extraction method according to an embodiment of the invention will be described with reference to FIG. 3. The boundary extraction method may include a gradient estimation step S301, a gradient adjustment step S302 and a boundary extraction step S303.

Figure 5:
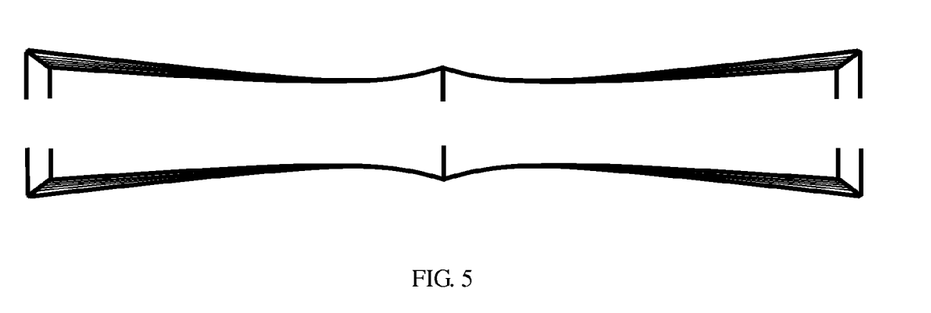
FIG. 5 schematically illustrates an example of a gradient diagram of upper and lower boundaries of the captured book image by way of example.

Specifically, in the gradient estimation step S301, a gradient of each of pixels in the captured image is estimated to obtain a gradient diagram of the upper and lower boundaries as shown in FIG. 5. Particularly, the non-contact imaging device such as the top-mounted scanner is used to capture an image of an open book on a desk so that an example of an imaging result as shown in FIG. 2 is obtained. This gradient diagram is generally obtained based on a pixel value of each of the pixels in the image. Since the open book has a certain thickness, the gradient diagram of the upper and lower boundaries obtained by directly using existing technologies contains a plurality of curves, as shown in FIG. 5. In other words, the obtained boundary gradient diagram not only includes a gradient of the target boundary of the current page but also include gradients of noise boundaries of other pages. The existing technology for extracting the object boundary is generally based on a principle that when there exists significant contrast between the object and an background, the boundary of the object usually locates at points in the image which have maximum pixel gradients, and thus the boundary of the object is extracted by tracking the curve having the maximum gradient in the image. Therefore, it is desirable to enhance the gradient of the target boundary and weakening the gradient of the noise boundary, and thus it is possible to accurately extract the boundary of the object.

Next, in the gradient adjustment step S302, the boundary gradient diagram obtained in the gradient estimation step S301 may be adjusted by enhancing the gradient of the target boundary of the object contained in the captured image and weakening the gradient of the noise boundary, so that the adjusted gradient is considered as a current gradient.

In particular, in the gradient adjustment step S302, a weight determined based on a difference between gradients of two predetermined adjacent regions of each pixel point may be used to weigh the gradients estimated in the gradient estimation step S301, and thus enhancing the gradient of the target boundary and weakening the gradient of the noise boundary.

Preferably, the weight is determined based on the following formula:

$$TB = D_t/(D_b + \epsilon)$$

where $D_t = \max\{f(N_t)\} - \min\{f(N_t)\}$, $D_b = \max\{f(N_b)\} - \min\{f(N_b)\}$, $N_t$ and $N_b$ indicate the two predetermined adjacent regions of each pixel point, $D_t$ indicates a difference between a maximum gradient and a minimum gradient in the region $N_t$, $D_b$ indicates a difference between a maximum gradient and a minimum gradient in the region $N_b$, $D_t \geq D_b$, and $\epsilon$ is a predetermined constant to handle a case in which $D_b$ is zero.

Figure 6A:
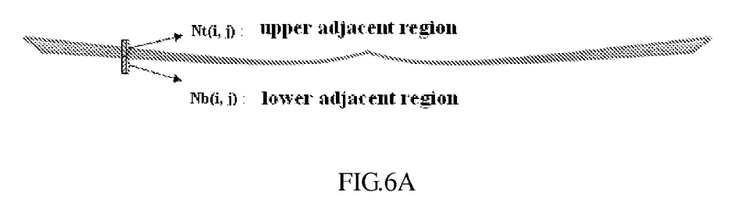
FIG. 6A and FIG. 6B schematically illustrate gradient diagrams of the upper boundary of a page before and after adaptive enhancement respectively.

Specifically, with reference to FIG. 6A, taking the upper boundary of the page as an example, it can be known from the imaging principle that the possibly existing noise boundaries of other pages might only occur above the target boundary. Assume that the content near the target boundary has a uniform background, and thus the gradient of a region below the target boundary is weak and there might be noise boundaries of other pages in an upper region. Based on this, the two predetermined adjacent regions of each pixel point refer to the upper and lower adjacent regions of each pixel respectively for the above formula.

Next, the original gradient diagram obtained in the step S301 is smoothed first so as to weaken the influence of the image noise. Then, for each one pixel, a maximum gradient value of its upper and lower adjacent regions is calculated. In this example, $N_t$ refers to the upper region of the pixel, and $N_b$ refers to the lower region of the pixel, the size of the region is an empirical value, and $D_t$ and $D_b$ respectively refer to a difference between the maximum gradient value and the minimum gradient value in the upper region and the lower region of the pixel. It can be known from the above assumption that for the target boundary, the content of the lower region has the uniform background, and thus the value of $D_b$ is small, while the value of $D_t$ is large due to the existence of the noise boundary in the upper region. For the noise boundary, the value of $D_b$ is large since the lower region has no uniformity.

Figure 6B:
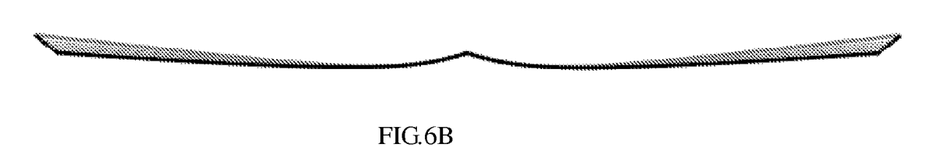

Therefore, as can be known from the above formula, the weight of the target boundary is much larger than that of the noise boundary, and thus the calculated weight of each pixel point is used to weigh the original gradient diagram so as to enhance the gradient of the target boundary while weakening the gradient of the noise boundary. For example, FIG. 6B illustrates an example of the gradient diagram of the upper boundary of the current page obtained by weighting, and it can be clearly seen from FIG. 6B that the target boundary is greatly enhanced as compared with the noise boundary, and thus it is possible to accurately extract the target boundary based on the adjusted gradient diagram.

It should be understood that the upper boundary of the page is used as example herein to describe how to adjust the original gradient diagram, but the invention is not limited thereto, and it is also possible to adjust the lower, left and right boundaries of the page.

For example, when adjusting the gradient of the lower boundary of the page, for the above described formula, the upper region of the lower boundary of the page is uniform, and the lower region is not uniform due to the existence of the noise disturbance, and thus $N_t$ refers to the lower region and $N_b$ refers to the upper region at this time. As a result, for the lower boundary of the page as the target boundary, the content of the upper region has a uniform background and thus the value of $D_b$ is small, while the value of $D_t$ is large due to the existence of the noise boundary in the lower region. As for the noise boundary, the upper region has no uniformity and thus the value of $D_b$ is large. Similarly, the original gradient diagram of the lower boundary of the page is weighed using the weight calculated according to the forgoing formula, and thus the gradient of the lower boundary of the current page as the target boundary is enhanced while the gradients of the lower boundaries of other pages as the noise boundaries are weakened.

Similarly, the principle of the gradient adjustment for the left and right boundaries of the page is the same as the above example. However, as can be known from the imaging principle, the noise boundaries are located on the left or right side for the left and right boundaries, and the calculation of the gradient diagram is performed in a direction perpendicular to that of the gradient diagram of the upper and lower boundaries (that is, the left-right direction), and thus $N_t$ and $N_b$ respectively refer to the left and right adjacent regions for the above weight calculation formula, and other operations are similar to those of the gradient adjustment for the upper boundary, no repeated description will be made herein.

Next, in the boundary extraction step S303, the boundary of the object (the book in this example) may be extracted based on the current gradient obtained in the gradient adjustment step S302. The method for extracting the target boundary according to the gradient diagram is a well-known technique in this art and no repeated description will be made herein. See for example the method disclosed in Eric N. Mortensen and William A. Barrett, Interactive Segmentation with Intelligent Scissors, Graphical Models and Image Processing, No. 60, pp. 349-384, 1998.

Although the gradient of the target boundary is enhanced and the gradient of the noise boundary is weakened according to the processing in the above steps S301 to S303, it still can not ensure a correct boundary can be tracked based on the enhanced boundary gradient using an existing method. Therefore, it is desirable that the object boundary extracted based on the above adjusted gradient can be checked and corrected so as to further improve the accuracy of the boundary extraction. The present invention presents an iterative boundary correction method, and according to the preferred embodiments of the invention, this boundary extraction method may further include an error boundary determination step S304, a gradient correction step S305 and an iteration step S306.

In the error boundary determination step S304, smoothness of the boundary extracted in the step S303 may be detected to determine whether the extracted boundary is error.

Figure 7A:
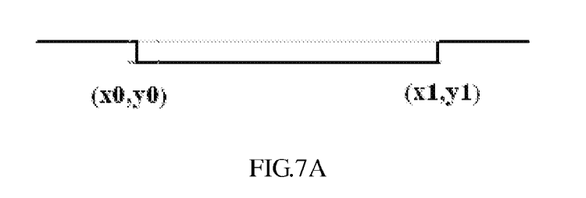
FIG. 7A and FIG. 7B schematically illustrate examples of gradient diagrams of the page boundary before and after eliminating the disturbing gradients respectively.

Specifically, the smoothness of the boundary may be detected as follows: as known from the imaging principle, assuming that a correct curve of the boundary of the book is smooth and the reliability near a center of the extracted upper boundary is high, as shown in FIG. 7A, and taking the right half of the upper boundary as an example, each point (x, y) on the curve is detected starting from the center, for a point (x', y') apart from the point (x, y) by N pixels on the right side, in which x'=x+N, if |y'-y|>N*k, then it indicates that the curve is not smooth, where each of N and k is an empirical value and can be determined according to an experiment result in practical use. Once it has been detected that there exists non-smoothness to the right of a point (x0, y0), the gradient on the right side of the point (x0, y0) is determined to be a disturbing gradient, that is, the error boundary may be tracked, and thus the disturbing gradient needs to be corrected. It should be understood that the method for detecting the smoothness is only an example but not limitation, and those skilled in the art may detect the smoothness of the curve according to any known method in the art.

Next, in the gradient correction step S305, in a case that it is determined in the error boundary determination step S304 that the extracted boundary is error, the current gradient may be corrected so that the corrected gradient is considered as the current gradient.

Figure 4:
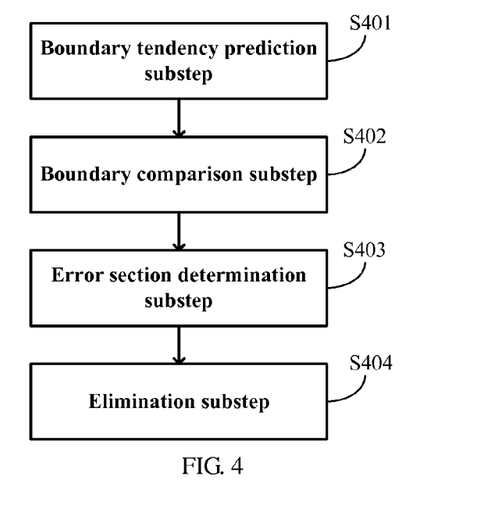
FIG. 4 is a flowchart illustrating processing in the gradient correction step shown in FIG. 3 in detail.

Specifically, with reference to FIG. 4, the gradient correction step S305 may further include a boundary tendency prediction substep S401, a boundary comparison substep S402, an error section determination substep S403 and an elimination substep S404.

Specifically, in the boundary tendency prediction substep S401, tendency of the object boundary in a predetermined direction may be predicted starting from a region for which reliability of the extracted boundary is high. Taking the right side of the upper boundary as the example again, a portion starting from the center of the upper boundary curve has a high reliability and the predetermined direction is the right direction. Therefore, as described above, for the t-th iteration, assume that it is detected in the error boundary determination step S304 that there exists non-smoothness to the right of the point (x0, y0), then a straight line is estimated from M (M is a predetermined numerical value) consecutive points to the left of the point (x0,y0) on the boundary curve extracted based on the gradient $g_{t-1}(x, y)$ determined in the (t−1)-th iteration, the straight line indicating the page boundary tendency in a normal range, that is, the page boundary tendency is predicted using a line fit-based method. It should be understood that the line fit method is only an example of the method for boundary tendency prediction and should not be interpreted as limitation, those skilled in the art may conceive of using other methods to perform tendency prediction.

Next, in the boundary comparison substep S402, each point on the extracted boundary is compared with the predicted tendency starting from a turning point at which the boundary is detected to be not smooth in the predetermined direction.

Specifically, in this embodiment, the predetermined direction is the right direction, the turning point is the point (x0, y0), and the comparison operation is to determine whether a distance between each point on the extracted boundary to the right of the point (x0, y0) and the predicted tendency is smaller than a predetermined threshold.

Then, in the error section determination substep S403, a section from the turning point to a first point on the extracted boundary the difference between which and the predicted tendency is smaller than a predetermined threshold is determined as the error section. Specifically, according to the comparison result in the boundary comparison substep S402, for the first point (x1, y1) on the extracted boundary the distance between which and the predicted straight line is smaller than the predetermined threshold, the section from the turning point (x0, y0) to the point (x1, y1) on the predicted boundary is determined as the error section, as shown in FIG. 7A.

Figure 7B:
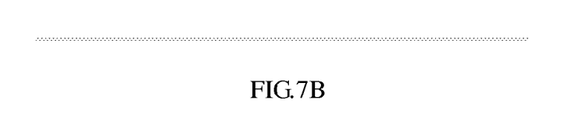

Next, in the elimination substep S404, the gradient of each point in the determined error section can be set to be zero. Specifically, the gradient corresponding to each point in the error section (for example, from the point (x0, y0) to the point (x1, y1)) determined in the error section determination substep S403 is set to be zero, thereby obtaining the gradient diagram $g_{t+1}(x, y)$ after gradient correction, as shown in FIG. 7B. By setting the disturbing gradient of the noise boundary to be zero, the noise boundary is weakened and it is possible to more accurately extract the target boundary.

Returning back to FIG. 3, in the iteration step S306, the boundary extraction step S303, the error boundary determination step S304 and the gradient correction step S305 may be performed repeatedly based on the current gradient until a predetermined criterion is satisfied. Specifically, in the boundary extraction step S303, the boundary of the object is extracted again based on the corrected gradient diagram $g_{t+1}(x, y)$ obtained in the gradient correction step S305, and the boundary extraction result is input into the error boundary determination step S304 as an input of the (t+1)-th iteration. If no error boundary is detected in the error boundary determination step S304 during certain iteration, then it means that the extracted boundary is smooth, that is, the accuracy of the extracted boundary satisfies the predetermined requirement at this time, and thus the iteration procedure is finished and a final boundary extraction result is output.

The above embodiments are only description with respect to the right side of the upper boundary of the target page, but it should be understood that the invention is not limited thereto, and it is possible to process any boundary according to the principle of the invention, even the boundary of other objects than the book can also be processed.

Although the boundary extraction method according to the embodiments of the invention has been described above in detail with reference to FIGS. 1-7B, those skilled in the art should appreciate that the flow charts as shown in the drawings are only exemplary and corresponding modifications may be made to the above method flows depending on different practical applications and specific requirements. For example, executing orders of certain steps in the above method may be adjusted or some processing steps may be omitted or added as required.

Corresponding to the boundary extraction method according to the embodiments of the invention, the embodiments of the invention further provide a boundary extraction apparatus.

Figure 8:
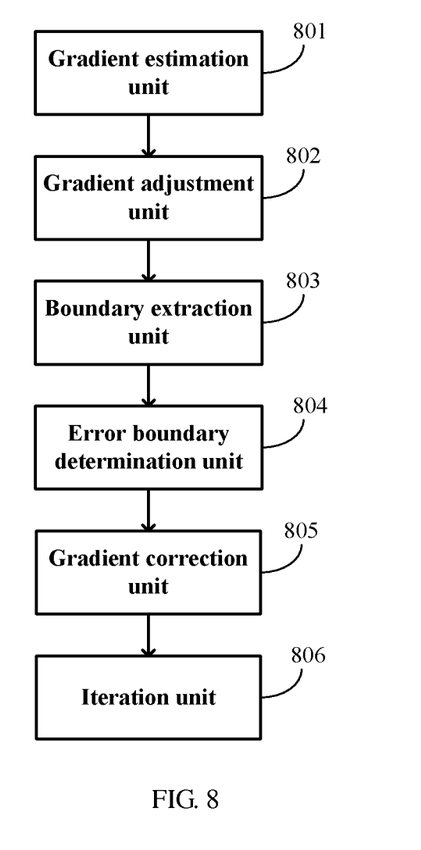
FIG. 8 is a block diagram of a functional configuration of a boundary extraction apparatus according to an embodiment of the invention.

Specifically, as shown in FIG. 8, the boundary extraction apparatus may include a gradient estimation unit 801, a gradient adjustment unit 802 and a boundary extraction unit 803. Functional configurations of respective units of the boundary extraction apparatus will be described with reference to FIG. 8 below.

The gradient estimation unit 801 may be configured to estimate a gradient of each pixel in a captured image. For example, the gradient estimation unit 801 may calculate a gradient value of each pixel in the image as shown in FIG. 2, and the gradient diagram of the upper and lower boundaries of the book as shown in FIG. 5 is obtained due to the contrast between the object boundary and the background.

The gradient adjustment unit 802 may be configured to adjust the gradient estimated by the gradient estimation unit 801 by enhancing a gradient of a target boundary of an object contained in the captured image and weakening a gradient of a noise boundary, so that the adjusted gradient is considered as a current gradient. Preferably, the gradient of the target boundary is enhanced and the gradient of the noise boundary is weakened by weighing the estimated gradient using the weight determined by the above formula. The detailed adjustment procedure may be referred to the description about the method according to the embodiments of the invention and no repeated description will be made herein.

The boundary extraction unit 803 may be configured to extract the boundary of the object (the book in this example) based on the current gradient.

As described above, although the accuracy of boundary extraction may be improved to some extent through the processing by the gradient estimation unit 801, the gradient adjustment unit 802 and the boundary extraction unit 803, it can not ensure the extracted boundary is just the actual page boundary. Therefore, preferably, the boundary extraction apparatus according to the embodiment of the invention may further include an error boundary determination unit 804, a gradient correction unit 805 and an iteration unit 806 which can perform iterative detection and correction on the extracted boundary to further improve the accuracy of the boundary extraction.

Specifically, the error boundary determination unit 804 may be configured to detect the smoothness of the boundary extracted by the boundary extraction unit 803 to determine whether the extracted boundary is error. Preferably, with respect to the upper boundary of the image of the book as an example, it is assumed that the actual boundary is smooth and the smoothness is detected towards the left and right sides starting from the center of the boundary of the book, thereby obtaining a turning point (x0, y0) to the right of which the curve is detected to be not smooth in the t-th iteration.

The gradient correction unit 805 may be configured to correct the current gradient so that the corrected gradient is considered as the current gradient in a case that the error boundary determination unit 804 determines the extracted boundary is error. Preferably, the gradient correction unit 805 further includes a boundary tendency prediction subunit 901, a boundary comparison subunit 902, an error section determination subunit 903 and an elimination subunit 904. Functional configurations of respective constituting subunits of the gradient correction unit 805 will be described with reference to FIG. 9 in detail below.

Figure 9:
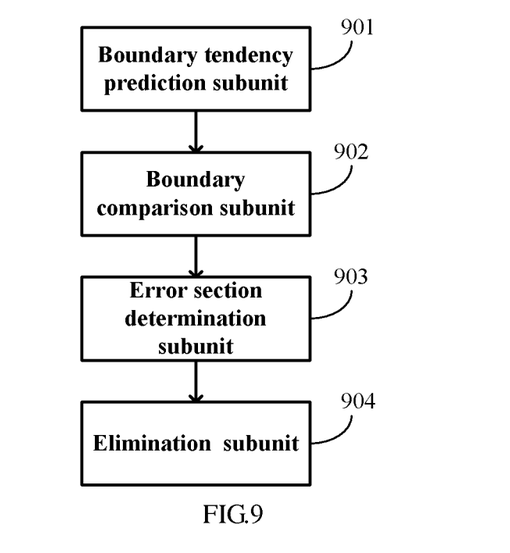
FIG. 9 is a block diagram illustrating a functional configuration of a gradient correction unit shown in FIG. 8 in detail.

The boundary tendency prediction subunit 901 may be configured to predict the tendency of the boundary of the object in a predetermined direction starting from a region for which reliability of the extracted boundary is high. Preferably, as an example, the tendency of the boundary to the right of the turning point (x0, y0) which is determined by the error boundary determination unit 804 is predicted according to M (M is a predetermined value) consecutive points to the left of the turning point (x0, y0) on the extracted boundary using the line fit-based method.

The boundary comparison subunit 902 may be configured to compare each point on the extracted boundary with the tendency predicted by the boundary tendency prediction subunit 901 starting from the turning point (x0, y0) at which the boundary is detected to be not smooth in the predetermined direction (the right direction in this example).

The error section determination subunit 903 may be configured to determine a section from the turning point (x0, y0) to a first point on the extracted boundary the difference between which and the predicted tendency is smaller than a predetermined threshold as an error section, that is, the section from the point (x0, y0) to the point (x1, y1) as shown in FIG. 7A.

The elimination subunit 904 may be configured to set a gradient of each point within the error section determined by the error section determination subunit 903 to be zero, thereby removing the influence of the disturbing gradient to further enhance the gradient of the target boundary.

Returning back to FIG. 8, the iteration unit 806 may be configured to repeatedly perform the processing of the boundary extraction unit 803, the error boundary determination unit 804 and the gradient correction unit 805 based on the current gradient until a predetermined criterion is satisfied. If no error boundary is detected in certain iteration, then it means that the extracted boundary curve is smooth, that is, the accuracy requirement for the boundary extraction is satisfied, and thus the iteration procedure is finished and a final boundary extraction result is output.

It is to be noted that the apparatus according to the embodiments of the invention corresponds to the forgoing method embodiment, and thus parts which are not described in detail in the apparatus embodiment may be referred to the description at the corresponding location in the method embodiment, and no repeated description will be made herein.

Further, it is to be noted that the above series of processing and apparatus may also be implemented by software and/or firmware. In a case that the embodiments of the invention are implemented by the software and/or firmware, programs constituting the software are installed from a storage medium or a network into a computer with a dedicated hardware structure, for example, a general-purpose computer 1000 illustrated in FIG. 10, which can carry out various functions and the like when installed with various programs.

Figure 10:
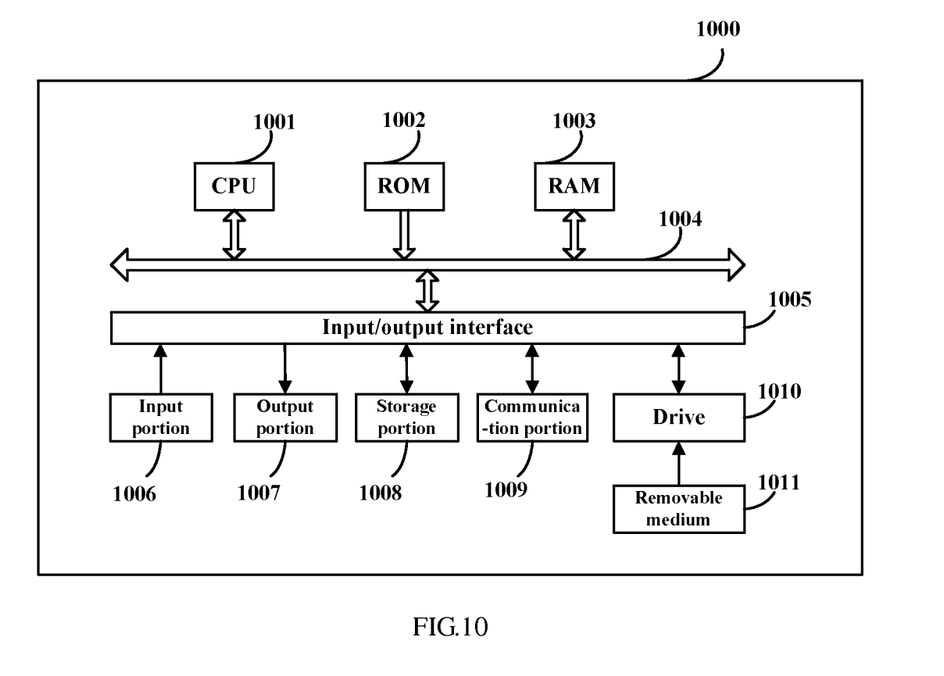
FIG. 10 is a block diagram illustrating an exemplary structure of a personal computer which is the information processing apparatus employed in the embodiments of the invention.

In FIG. 10, a central processing unit (CPU) 1001 executes various processes in accordance with a program stored in a read only memory (ROM) 1002 or a program loaded from a storage portion 1008 to a random access memory (RAM) 1003. Data required for the CPU 1001 to execute various processes and the like is also stored in the RAM 1003 as required.

The CPU 1001, the ROM 1002 and the RAM 1003 are connected to one another via a bus 1004. An input/output interface 1005 is also connected to the bus 1004.

The following components are connected to the input/output interface 1005: an input portion 1006 including a keyboard, a mouse, and the like; an output portion 1007 including a display such as a cathode ray tube (CRT), a liquid crystal display (LCD), and the like, a speaker and the like; the storage portion 1008 including a hard disk or the like; and a communication portion 1009 including a network interface card such as a LAN card, a modem, and the like. The communication portion 1009 performs communication via the network such as Internet.

A drive 1010 is also connected to the input/output interface 1005 as required. A removable medium 1011, such as a magnetic disk, an optical disk, a magneto optical disk, a semiconductor memory, or the like, is mounted on the drive 1010 as required, so that a computer program read therefrom is installed into the storage portion 1008 as required.

In a case that the above-described series of processes are implemented by the software, the program that constitutes the software is installed from the network such as the Internet or the storage medium such as the removable medium 1011.

Those skilled in the art should understand that this storage medium is not limited to the removable medium 1011 in which a program is stored and which is distributed separately from the device so as to provide the program to the user as shown in FIG. 10. Examples of the removable medium 1011 include the magnetic disk (including floppy disk (registered trade mark)), the optical disk (including compact disk-read only memory (CD-ROM) and digital versatile disk (DVD)), the magneto optical disk (including mini disk (MD) (registered trade mark)) and the semiconductor memory. Alternatively, the storage medium may be the ROM 1002, the hard disk contained in the storage portion 1008 or the like, in which a program is stored and which is distributed to the user together with the device containing it.

It shall also be noted that the steps of performing the above series of processes may be naturally performed chronologically in an order of description but not necessarily. Some steps may be performed in parallel or independently from one another.

Although the invention and advantages thereof have been described in detail herein, it shall be understood that various changes, replacements and modifications may be made by one skilled in the art without departing from the spirit and scope of the invention defined by the appended claims. Furthermore, the terms "comprise", "include" or any other variation thereof are intended to cover a non-exclusive inclusion, so that a process, method, article, or device that comprises a list of elements includes not only those elements but also other elements not explicitly listed or inherent to such process, method, article, or device. Unless further defined, a sentence "comprises a/an . . . " which defines an element does not preclude the existence of additional identical element(s) in the process, method, article, or device that comprises the element.

With respect to the implementations including the above embodiments, the following appendixes are also disclosed:

Appendix 1. A boundary extraction method, comprising:
a gradient estimation step of estimating a gradient of each pixel in a captured image;
a gradient adjustment step of adjusting, by enhancing a gradient of a target boundary of an object contained in the captured image and weakening a gradient of a noise boundary, the estimated gradient, so that the adjusted gradient is considered as a current gradient; and
a boundary extraction step of extracting a boundary of the object based on the current gradient.

Appendix 2. The method according to Appendix 1, wherein in the gradient adjustment step, the estimated gradient is weighed with a weight determined based on a gradient difference between two predetermined adjacent regions of each pixel point, thus enhancing the gradient of the target boundary and weakening the gradient of the noise boundary.

Appendix 3. The method according to Appendix 2, wherein the weight TB is determined based on the following formula:

$$TB = D_t/(D_b+\epsilon)$$

wherein $D_t=\max\{f(N_t)\}-\min\{f(N_t)\}$, $D_b=\max\{f(N_b)\}-\min\{f(N_b)\}$, $N_t$ and $N_b$ represent the two predetermined adjacent regions of each pixel point, $D_t$ represents a difference between a maximum gradient and a minimum gradient in the region $N_t$, $D_b$ represents a difference between a maximum gradient and a minimum gradient in the region $N_b$, $D_t \geq D_b$, and $\epsilon$ is a predetermined constant.

Appendix 4. The method according to Appendix 1, wherein after the boundary extraction step, the method further comprises:
an error boundary determination step of detecting smoothness of the extracted boundary to determine whether the extracted boundary is error;
a gradient correction step of correcting, in a case that the extracted boundary is error, the current gradient, so that the corrected gradient is considered as the current gradient; and
an iteration step of repeating, based on the current gradient, the boundary extraction step, the error boundary determination step and the gradient correction step until a predetermined criterion is satisfied.

Appendix 5. The method according to Appendix 4, wherein the gradient correction step further comprises:
a boundary tendency prediction substep of predicting, starting from a region for which reliability of the extracted boundary is high, tendency of the boundary of the object in a predetermined direction;
a boundary comparison substep of comparing, in the predetermined direction, each point on the extracted boundary with the predicted tendency, starting from a turning point at which the boundary is detected to be not smooth;
an error section determination substep of determining a section from the turning point to a first point on the extracted boundary the difference between which and the predicted tendency is smaller than a predetermined threshold as an error section; and
an elimination substep of setting a gradient of each point within the determined error section to be zero.

Appendix 6. The method according to Appendix 5, wherein in the boundary tendency prediction substep, a line fit-based method is used to predict the tendency of the boundary of the object.

Appendix 7. The method according to any one of Appendixes 1-6, wherein the object is a book.

Appendix 8. A boundary extraction apparatus, comprising:
a gradient estimation unit configured to estimate a gradient of each pixel in a captured image;
a gradient adjustment unit configured to adjust, by enhancing a gradient of a target boundary of an object contained in the captured image and weakening a gradient of a noise boundary, the estimated gradient, so that the adjusted gradient is considered as a current gradient; and
a boundary extraction unit configured to extract a boundary of the object based on the current gradient.

Appendix 9. The apparatus according to Appendix 8, wherein the gradient adjustment unit is configured to weigh the estimated gradient with a weight determined based on a gradient difference between two predetermined adjacent regions of each pixel point, thus enhancing the gradient of the target boundary and weakening the gradient of the noise boundary.

Appendix 10. The apparatus according to Appendix 9, wherein the weight TB is determined based on the following formula:

$$TB = D_t/(D_b+\epsilon)$$

wherein $D_t=\max\{f(N_t)\}-\min\{f(N_t)\}$, $D_b=\max\{f(N_b)\}-\min\{f(N_b)\}$, $N_t$ and $N_b$ represent the two predetermined adjacent regions of each pixel point, $D_t$ represents a difference between a maximum gradient and a minimum gradient in the region $N_t$, $D_b$ represents a difference between a maximum gradient and a minimum gradient in the region $N_b$, $D_t \geq D_b$, and $\epsilon$ is a predetermined constant, Appendix 11. The apparatus according to Appendix 8, further comprising:
an error boundary determination unit configured to detect smoothness of the extracted boundary to determine whether the extracted boundary is error;
a gradient correction unit configured to correct, in a case that the extracted boundary is error, the current gradient, so that the corrected gradient is considered as the current gradient; and
an iteration unit configured to repeat, based on the current gradient, processing in the boundary extraction unit, the error boundary determination unit and the gradient correction unit until a predetermined criterion is satisfied.

Appendix 12. The apparatus according to Appendix 11, wherein the gradient correction unit further comprises:
a boundary tendency prediction subunit configured to predict, starting from a region for which reliability of the extracted boundary is high, tendency of the boundary of the object in a predetermined direction;
a boundary comparison subunit configured to compare, in the predetermined direction, each point on the extracted boundary with the predicted tendency, starting from a turning point at which the boundary is detected to be not smooth;

an error section determination subunit configured to determine a section from the turning point to a first point on the extracted boundary the difference between which and the predicted tendency is smaller than a predetermined threshold as an error section; and an elimination subunit configured to set a gradient of each point within the determined error section to be zero.

Appendix 13. The apparatus according to Appendix 12, wherein the boundary tendency prediction subunit is configured to use a line fit-based method to predict the tendency of the boundary of the object.

Appendix 14. The apparatus according to any one of Appendixes 8-13, wherein the object is a book.

The invention claimed is:

1. A boundary extraction method, comprising:
   a gradient estimation step of estimating a gradient of each pixel in a captured image;
   a gradient adjustment step of adjusting, by enhancing a gradient of a target boundary of an object contained in the captured image and weakening a gradient of a noise boundary, the estimated gradient, so that the adjusted gradient is considered as a current gradient; and
   a boundary extraction step of extracting a boundary of the object based on the current gradient,
   wherein in the gradient adjustment step, the estimated gradient is weighed with a weight determined based on a gradient difference between two predetermined adjacent regions of each pixel point to enhance the gradient of the target boundary and weaken the gradient of the noise boundary.

2. The method according to claim 1, wherein the weight TB is determined based on the following formula:

$$TB = D_t / (D_b + \epsilon)$$

wherein $Dt = \max\{f(Nt)\} - \min\{f(Nt)\}$, $Db = \max\{f(Nb)\} - \min\{f(Nb)\}$, Nt and Nb represent the two predetermined adjacent regions of each pixel point, Dt represents a difference between a maximum gradient and a minimum gradient in the region Nt, Db represents a difference between a maximum gradient and a minimum gradient in the region Nb, $Dt \geq Db$, and $\epsilon$ is a predetermined constant.

3. The method according to claim 1, wherein after the boundary extraction step, the method further comprises:
   an error boundary determination step of detecting smoothness of the extracted boundary to determine whether the extracted boundary is error;
   a gradient correction step of correcting, in a case that the extracted boundary is error, the current gradient, so that the corrected gradient is considered as the current gradient; and
   an iteration step of repeating, based on the current gradient, the boundary extraction step, the error boundary determination step and the gradient correction step until a predetermined criterion is satisfied.

4. The method according to claim 3, wherein the gradient correction step further comprises:
   a boundary tendency prediction substep of predicting, starting from a region for which reliability of the extracted boundary is high, tendency of the boundary of the object in a predetermined direction;
   a boundary comparison substep of comparing, in the predetermined direction, each point on the extracted boundary with the predicted tendency, starting from a turning point at which the boundary is detected to be not smooth;
   an error section determination substep of determining a section from the turning point to a first point on the extracted boundary the difference between which and the predicted tendency is smaller than a predetermined threshold as an error section; and
   an elimination substep of setting a gradient of each point within the determined error section to be zero.

5. A boundary extraction apparatus, comprising:
   a processor configured to:
   estimate a gradient of each pixel in a captured image;
   adjust, by enhancing a gradient of a target boundary of an object contained in the captured image and weakening a gradient of a noise boundary, the estimated gradient, so that the adjusted gradient is considered as a current gradient;
   extract a boundary of the object based on the current gradient, and
   weigh the estimated gradient with a weight determined based on a gradient difference between two predetermined adjacent regions of each pixel point, thus enhancing the gradient of the target boundary and weakening the gradient of the noise boundary.

6. The apparatus according to claim 5, wherein the weight TB is determined based on the following formula:

$$TB = D_t / (D_b + \epsilon)$$

wherein $Dt = \max\{f(Nt)\} - \min\{f(Nt)\}$, $Db = \max\{f(Nb)\} - \min\{f(Nb)\}$, Nt and Nb represent the two predetermined adjacent regions of each pixel point, Dt represents a difference between a maximum gradient and a minimum gradient in the region Nt, Db represents a difference between a maximum gradient and a minimum gradient in the region Nb, $Dt \geq Db$, and $\epsilon$ is a predetermined constant.

7. The apparatus according to claim 5, wherein the processor is further configured to:
   detect smoothness of the extracted boundary to determine whether the extracted boundary is error;
   correct, in a case that the extracted boundary is error, the current gradient, so that the corrected gradient is considered as the current gradient; and
   repeat, based on the current gradient, processing in the boundary extraction unit, the error boundary determination unit and the gradient correction unit until a predetermined criterion is satisfied.

8. The apparatus according to claim 7, wherein the processor is further configured to:
   predict, starting from a region for which reliability of the extracted boundary is high, tendency of the boundary of the object in a predetermined direction;
   compare, in the predetermined direction, each point on the extracted boundary with the predicted tendency, starting from a turning point at which the boundary is detected to be not smooth;
   determine a section from the turning point to a first point on the extracted boundary the difference between which and the predicted tendency is smaller than a predetermined threshold as an error section; and
   set a gradient of each point within the determined error section to be zero.

* * * * *